United States Patent [19]

Batchelder et al.

[11] Patent Number: 5,764,521

[45] Date of Patent: Jun. 9, 1998

[54] METHOD AND APPARATUS FOR SOLID PROTOTYPING

[75] Inventors: John Samuel Batchelder, Somers; Robert R. Jackson, Millbrook, both of N.Y.

[73] Assignee: Stratasys Inc., Eden Prairie, Minn.

[21] Appl. No.: 556,583

[22] Filed: Nov. 13, 1995

[51] Int. Cl.$^6$ .............................. G06F 19/00; B29C 47/38
[52] U.S. Cl. .................. 364/475.01; 364/468.26; 364/468.25; 364/474.24; 364/473.01; 364/475.02; 364/475.08; 156/312; 156/350; 156/244.21; 264/40.7; 264/171.11; 264/171.18; 264/211.21; 264/211.23; 264/328.13; 425/145; 425/149; 425/375
[58] Field of Search .......... 364/475.01, 468.25, 364/468.26, 468.24, 474.24, 472.02–472.03, 473.01, 475.02, 475.08; 264/13, 171.11, 171.17–171.18, 176.1, 211.21, 211.23, 255, 308, 328.13, 510, 514, 540, 40.5, 40.7; 156/314, 311–312, 350, 358, 367, 379.8, 242, 244.21; 425/145, 149, 375, 378.1

[56] References Cited

U.S. PATENT DOCUMENTS

| | | | |
|---|---|---|---|
| 556,472 | 3/1896 | McCarroll | 118/301 |
| 1,533,300 | 4/1925 | Baker | 219/76.12 |
| 3,932,923 | 1/1976 | DiMatteo | 29/407.05 |
| 4,436,258 | 3/1984 | Jackson et al. | 242/18 G |
| 4,665,492 | 5/1987 | Masters | 364/468.26 |
| 4,749,347 | 6/1988 | Valavaara | 425/135 |
| 5,038,014 | 8/1991 | Pratt et al. | 219/121.64 |
| 5,059,266 | 10/1991 | Yamane et al. | 156/64 |
| 5,121,329 | 6/1992 | Crump | 364/468.25 |
| 5,134,569 | 7/1992 | Masters | 364/474.24 |
| 5,192,559 | 3/1993 | Hull et al. | 425/89 |
| 5,303,141 | 4/1994 | Batchelder et al. | 364/149 |
| 5,312,224 | 5/1994 | Batchelder et al. | 415/73 |
| 5,340,433 | 8/1994 | Crump | 156/578 |
| 5,402,351 | 3/1995 | Batchelder et al. | 364/468.26 |
| 5,518,672 | 5/1996 | Luker | 264/40.1 |
| 5,567,368 | 10/1996 | Ando et al. | 264/40.1 |
| 5,576,911 | 11/1996 | Porter | 360/98.06 |
| 5,598,948 | 2/1997 | Rizer | 221/198 |
| B1 4,575,330 | 12/1989 | Hull | 425/174.4 |

*Primary Examiner*—Emanuel T. Voeltz
*Assistant Examiner*—Than Q. Dam
*Attorney, Agent, or Firm*—Ohlandt, Greeley, Ruggiero & Perle

[57] ABSTRACT

An improved extrusion-based manufacturing system includes one or more extruders, with each extruder containing at least two stages of increasing pressurization. In a preferred embodiment, a first stage of pressurization is created by the motion of a solid wafer of thermoplastic through an orifice into a heater chamber. In another preferred embodiment, the wafers are stored in removable, electronically tagged, cassettes and are removed therefrom by a stapler mechanism which feeds the wafers from the cassette to a tractor feed mechanism on demand. In each embodiment, a second stage of pressurization is provided by a pump, with the first stage pressurization maintaining a flow of thermoplastic to the pump under all expected pump rates.

16 Claims, 5 Drawing Sheets

METHOD AND APPARATUS FOR SOLID PROTOTYPING

FIELD OF THE INVENTION

This invention relates to a layered prototyping method and apparatus and, more particularly, to a solid prototyping system wherein plural pressurization stages enable improved production of solid models.

BACKGROUND OF THE INVENTION

Layered manufacturing existed more than ten thousand years ago, embodied by artisans sequentially adding rolls of clay to build up complex objects such as pots and vases. More recent improvements include depositing metals as described in W. W. McCarroll, U.S. Pat. No. 556,472, and R. Baker, U.S. Pat. No. 1,553,300; depositing UV curable polymers as in A. J.Herbert, "Solid Object Generation", J .Appl. Phot. Eng., 1982, and C. W. Hull, U.S. Pat. No. 4,575,330; jetting of droplets of material as in W. E. Masters, U.S. Pat. No. 4,665,492; sintering of particulates as in V. Pratt et al, U.S. Pat. No. 5,038,014; applying continuous ribbons as described in P. L. DiMatteo, U.S. Pat. No. 3,932 923; and applying shaped layers of paper as in C. W. Hull et al, U.S. Pat. No. 5,192,559.

Cumulatively such procedures are termed layered manufacturing. In the more recent computerized embodiments, a mathematical description of a physical part to be created is split into (usually) planar layers, and those layers are individually shaped and applied to produce the final part.

The dominant application of layered manufacturing in recent years has been for rapid prototyping; rapidly producing physical equivalents of Computer Aided Design (CAD) models for design verification; interference testing; customer acceptance; and functional testing. Computer controlled deposition of solidifiable material is described in V. Valavaara, U.S. Pat. No. 4,749,347. The Valavaara technique is modified with a vertically oriented nozzle in J. S. Batchelder et al., IBM Technical Disclosure Bulletin, Oct. 1, 1990 .An improvement, using a filament or rod solid material feed, is described in S. S. Crump, U.S. Pat. No. 5,121 329. Additional improvements are described in S. S. Crump, 5,340,433, and J. S. Batchelder et al., U.S. Pat. No. 5,402, 351.

An object of this invention is to resolve conflicting requirements in improved performance extrusion based layered manufacturing. The core focus of the invention is to simultaneously increase the rate that material is extruded from a nozzle so that parts can be built more quickly, to enable an increase in the viscosity of the extrudate so as to produce physical parts with more desirable mechanical properties, and to decrease the cross-sectional area of the extrudate to achieve better feature resolution. The combination of high required pressure, high rates of material flow, and high rates of change of pressure are not adequately served by the existing art.

A second object of the invention is to better utilize the innate capability of extrusion-based layered manufacturing in locally varying the composition of the material being deposited. This includes multiple extruders, an ability to automatically feed an extruder from one of several material sources, and an ability to track the availability and deposition characteristics of these several sources.

A third object of the invention is to provide a system that performs layered manufacturing which functions without significant operator assistance in typical engineering environments. This includes the ability to monitor and modify processing characteristics, simple and automatic handling of the generated parts, an environmental vibration-insensitive design and low vibration generation.

SUMMARY OF THE INVENTION

An improved extrusion-based manufacturing system includes one or more extruders, with each extruder containing at least two stages of increasing pressurization. In a preferred embodiment, a first stage of pressurization is created by the motion of a solid wafer of thermoplastic through an orifice into a heater chamber. In another preferred embodiment, the wafers are stored in removable, electronically tagged, cassettes and are removed therefrom by a stapler mechanism which feeds the wafers from the cassette to a tractor feed mechanism on demand. In each embodiment, a second stage of pressurization is provided by a pump, with the first stage pressurization maintaining a flow of thermoplastic to the pump under all expected pump rates.

DESCRIPTION OF THE PREFERRED EMBODIMENTS

Figure 1:
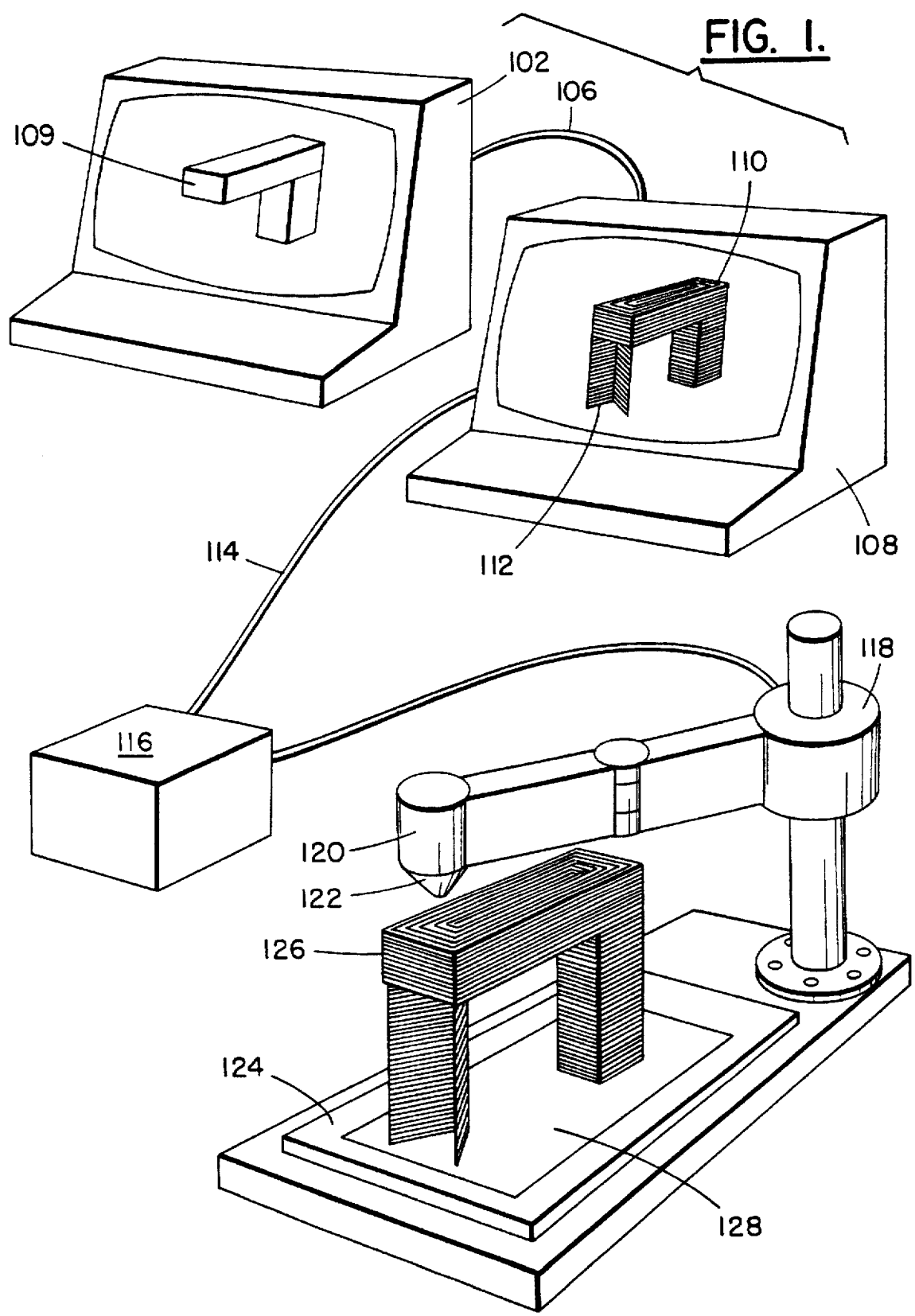
FIG. 1 shows a schematic of an extrusion-based, layered manufacturing system.

Process flow in extrusion-based layered manufacturing generally is shown in FIG. 1. A computer aided design (CAD) program is resident in processor 102 and generates a file describing the geometry of a part 104 to be manufactured. This file is transferred over a communication link 106 a further processor 108 which includes a program which algorithmically sub-divides the file into volume elements corresponding to shapes 110 that can be extruded from a nozzle. Additional volume elements 112 are added to provide mechanical support to a part during its construction. The volume elements are sequentially ordered so that deposited material is supported appropriately and so that previously deposited material does not interfere with subsequent deposition.

Instantaneous velocities and deposition rates are associated with the trajectories to be used by an extrusion head which forms a sequence of volume elements 112. An electronic controller 116, in response to signals received over line 114, causes a robot/gantry 118 to sequentially position an extruder head 120 and nozzle 122 with respect to a supporting substrate 124 in accordance with the determined trajectories and a time base. The extruder synchronously impels thermoplastic material out of nozzle 122 at the predetermined extrusion rate to produce a final part 126. Part 126 is adhered to substrate 124 by a layer of a low melting point thermoplastic adhesive 128 (whose function will be considered in further detail below).

Two Stage Pressurization

The design of an extruder for high speed layered manufacturing is prescribed by peak pressure capability, pressure agility, pressure uniformity, evolved gas, temperature compatibility, reliability, and cost.

Peak Pressure: Viscosities (v) of interesting extrusion materials vary from a few centipoise for waxes and liquid metals to about 10,000 poise for engineering plastics. Nozzle orifice inner diameters (d) of interest range from 0.003 inches to 0.03 inches. The maximum linear velocity (V) for the nozzle while it is depositing extrudate, with a cross-section approximately equal to the nozzle orifice, varies from 0.2 inches per second to about 20 inches per second. Assuming that the length of the orifice is typically twice the orifice's inner diameter, Poisseuille's formula for pressure drop in a pipe can be rewritten to estimate the pressure drop associated with impelling an extrudate through a nozzle orifice:

$$\Delta P = 64 \cdot v \cdot V/d$$

At the limit of low speed, low viscosity, and large orifice size, the required operating pressure is about 0.00006 psi above ambient; at the limit of high speed, high viscosity, and small orifice size, the required operating pressure is 60,000 psi above ambient, or a billion times larger than the low pressure limit.

Pressure Agility: Mechanical constraints require that a gantry slow its velocity along straight line trajectories as it approaches non co-linear intersections of straight line trajectories. The time constraint that parts should be built as quickly as possible requires that the gantry speed up as it leaves such an intersection. As a result, the magnitude of the instantaneous vector velocity of the nozzle with respect to the supporting base changes rapidly. For example, a gantry with 0.3 g's of acceleration moving at 20 inches per second will come to a complete stop in 50 milliseconds. This dictates the maximum response time for the extruder to either come from zero to full pressure, or to come from full pressure back to zero.

Pressure Uniformity: Variations in the extrusion rate, apart from those required to build the part, cause observable fluctuations in the surface of a final part. Variability of 1 percent or less is typically required to make the extrusion appear uniform.

Evolved Gas: Many extrusion materials release gas when transported through an extruder. Thermoplastic polymers that are somewhat hygroscopic will release water vapor or steam as they are heated to their melt temperature. Other types of gasses that can be released are plasticizers, monomers, and oxidation products. Gas in the pressurized portion of the extruder acts as a surge tank or regulator and reduces the extruder's pressure agility. Thus, in the preferred embodiment, the volume of extrusion material that is brought to full pressure is kept as small as possible.

In order to satisfy these conflicting requirements, as well as to make a low mass extruder that is inexpensive to manufacture and is reliable in use, the pressurization process performed by the extruder is split into two or more stages. Each stage is obliged to optimize for only some of the criteria. A stage of pressurization is a mechanical sub-unit through which the extrusion material flows which generates a pressure at its output that can be higher than the pressure at its input.

In all preferred embodiments, the first stage of pressurization increases the absolute pressure experienced by the extrusion material from an initial pressure to an intermediate pressure. The initial pressure is usually ambient atmospheric pressure. The intermediate pressure is a level between the initial pressure and the peak pressure required to impel the extrusion material out of the nozzle. The intermediate pressure is that required to impel the extrusion material into the inlet of a second stage of pressurization at a maximum required volumetric deposition rate. More specifically, the intermediate pressure assures an adequate flow of the extrusion material to the second stage of pressurization under all expected volumetric deposition rates and assures a non-interrupted flow of the extrusion material.

In all preferred embodiments, the second stage of pressurization includes a pump which increases the absolute pressure experienced by the extrusion material from the intermediate pressure to whatever instantaneous pressure is required to impel the extrusion material out of the nozzle at a predetermined rate, up to the maximum required volumetric deposition rate.

Figure 2:
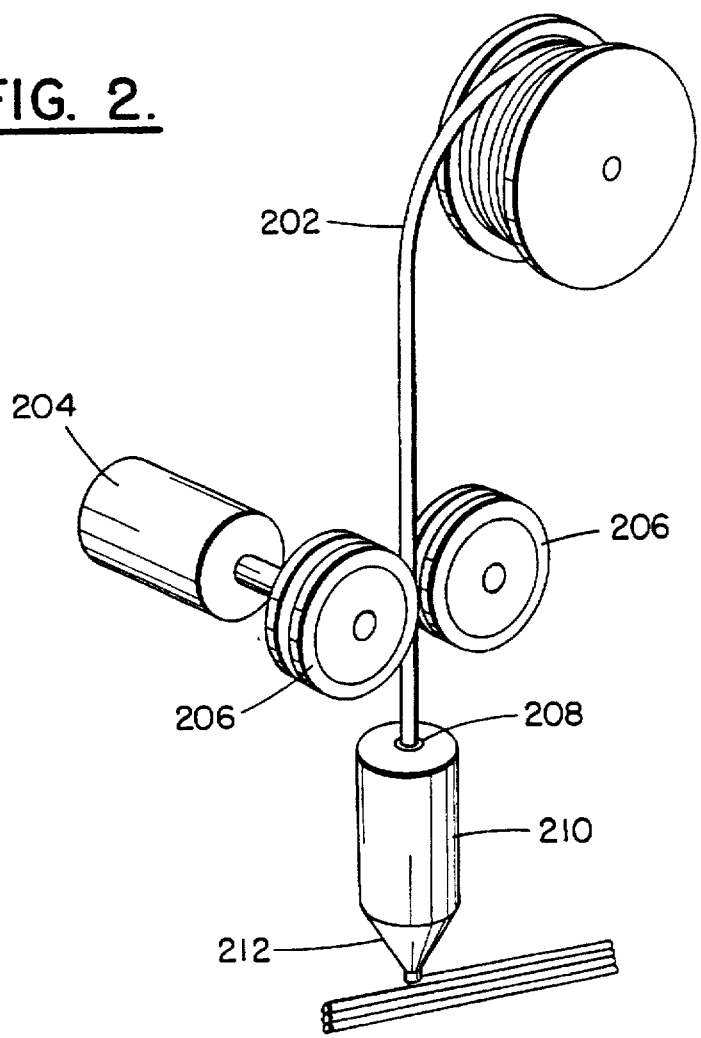
FIG. 2 shows a schematic of a filament drive for an extrusion-based, layered manufacturing system.

FIG. 2 shows a filament drive in which a 0.07 inch diameter filament of thermoplastic 202 is impelled, by a motor 204 driving rubber cushioned rollers 206, to slide through an orifice 208 into a heated tube 210 and out of a nozzle 212. This mechanism is one embodiment of a first stage of pressurization.

Figure 3:
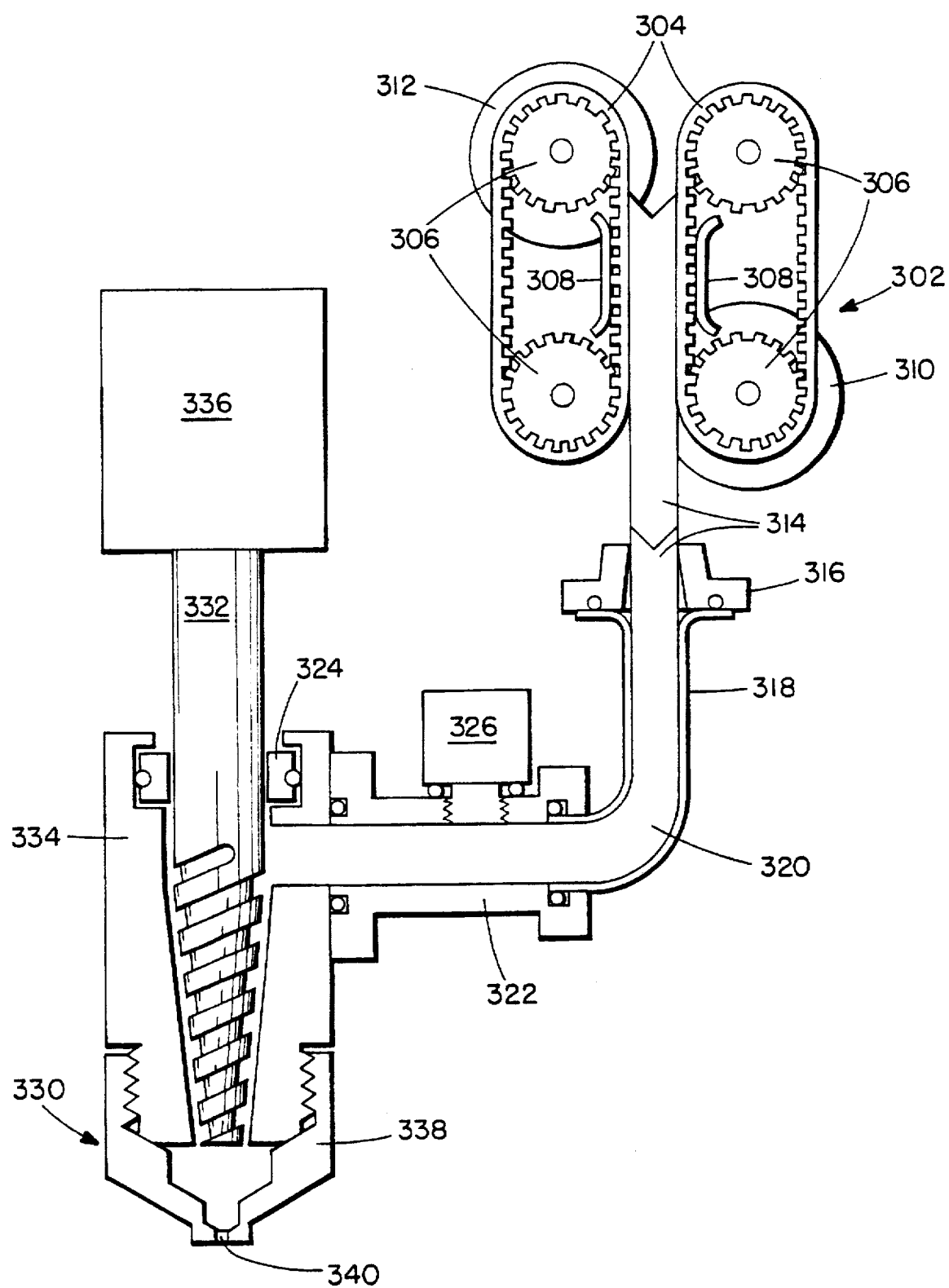
FIG. 3 shows an embodiment of the invention including a two stage pressurization system.

FIG. 3 shows a preferred embodiment of the invention which employs a tractor drive 302, comprising toothed belts 304, pulleys 306, pressure plates 308, drive motor 310 and encoder 312. Motor 310 and drive belts 304 act to force feed a cuboid or wafer of extrusion material 314 through a pre-heater entrance 316 into a heated channel (pre-heater) 318 which includes heating elements (not shown). The extrusion material exits pre-heater 318 in a fluid, flowable form via region 320.

The tractor mechanism is a preferred embodiment of a first stage of pressurization. Other first stage pressurization mechanisms may include hypodermic syringes, rod drives, gear pumps and pneumatic or hydraulic pressurization devices.

In addition to providing sufficient pressure to feed the second stage of the extruder, the first stage fulfills several other functions. If the extrusion material is not stored and transported in flowable form, the first stage causes the extrusion material to be flowable. In the preferred embodiment, the first stage is a liquefier that heats thermoplastics. Gas evolved in the first stage of the extruder is separated while at the relatively low pressure of the output of the first stage.

In FIG. 3, gas that evolves from fluid extrusion material in pre-heater 318 separates from the extrusion material in a communication channel 322 and escapes out of the extruder through a rotary seal 324 at the entrance to the second stage of pressurization.

The feed rate of the extrusion material through the first stage of pressurization can be regulated by back pressure from the second stage, by feedback from the output pressure of the first stage, or a combination of feedback mechanisms. In FIG. 3, a pressure sensor 326 is coupled to communication channel 322 and provides signals indicative of the pressure therein to a controller which, in turn, regulates the feed rate of tractor drive 302.

The second stage of pressurization includes a conical viscosity pump 330, as described by J. S.Batchelder et al in U.S. Pat. No. 5,312,224. Fluid extrusion material 320 from communication channel 322 feeds into a rotary impeller 332 which a variable speed motor 336 rotates in a female collet 334 to drive the fluid extrusion material towards and out of a removable nozzle 338 and orifice 340.

The design shown in FIG. 3 addresses the need for high pressures, quick pressure agility, and pressure uniformity. The first stage prevents the pump from starving or cavitating at its input when used with high viscosity extrusion materials. Other second stages include gear pumps, oscillating piston pumps, vane pumps, single and dual worm pumps, etc..

Extrusion Material Packaging: By the nature of layered manufacturing, a substantial amount of extrusion material is dispensed in the process of creating a part; typical deposition rates are between 0.1 and 10 cubic inches per hour. If the extrusion material is constrained to be of a single type within the system, a number of material handling techniques are effective. These include filament from spools, fluid feed from a remote reservoir, pellet feed from a hopper, and slug feed from a magazine.

In the preferred embodiments, solid wafers of source extrusion material are used. The dimensions of the wafers are determined as follows. Pre-heater entrance 316 has a rectangular opening of height H and width W, and pre-heater 318 has a straight passage of length L. At the maximum extrusion rate Q of the system, the dwell time $\tau_{dwell}$ of the extrusion material in this straight section (assuming plug flow) is $$\tau_{dwell} = L \cdot H \cdot W / Q$$

The melt time required for sufficient heat to diffuse from the inner surfaces of pre-heater 318 through the extrusion material is characterized by an exponential decay time constant of $$\tau_{dwell} = H^2 \cdot \rho \cdot C / K \cdot \pi^2$$

where K, C, and ρ are the thermal conductivity, heat capacity, and density of the extrusion material, respectively. Since the dwell time must be at least as large as about three exponential melt times, a requirement is that the thickness H of the entrance, and therefore the thickness of the wafers, satisfy the constraint:

$$H \leq L \cdot W \cdot K \cdot \pi^2 / 3 \cdot Q \cdot \rho \cdot C$$

In the preferred embodiment, the need to keep the extruder small in size and mass plus mechanical interference restrictions constrain L and W to be at most about 1 inch and 0.75 inches, respectively. K for the thermoplastic polymers is about 0.2 watts per (meter degree Centigrade), ρ is about 1.2 gram per cubic centimeter, and C is about 1.3 joules per (gram degree Centigrade). Therefore for a maximum extrusion rate of 10 cubic inches per hour, the thickness of the wafers should be less than 0.18 inches. A wafer should not be substantially thinner than this limit in order that it not buckle or bend as tractor 302 drives the wafer into the pre-heater 318.

Figure 4A:
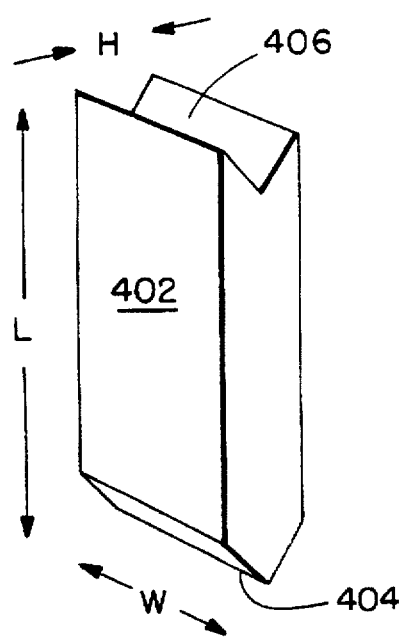
FIGS. 4(a) and 4(b) show configurations of wafers of thermoplastic material.

FIG. 4a shows an example of a wafer 402. Typical dimensions are H=0.15 inches, W=0.75 inches, and length of 2 inches. Since tractor 302 impels a sequence of wafers 402 into the pre-heater entrance 316, it is preferable to shape the leading end of each wafer so that it mates with the trailing end of a wafer and resists shear. A preferred embodiment of wafer 402 includes a leading edge 404 which is shaped to mate in a grooved trailing edge 406. This design has the advantage that leading edge 404 guides wafer 402 through the entrance of pre-heater 318.

Figure 4B:
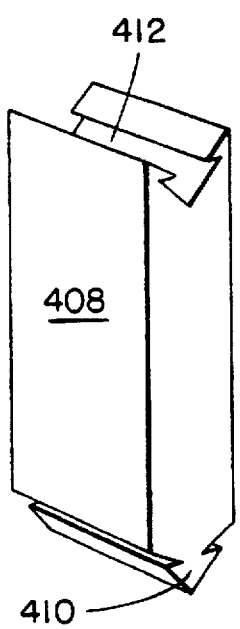

FIG. 4b shows an alternative embodiment where wafer 408 has a keyed tongue 410 that mates with a keyed groove 412 and allows tensile as well as compressive force to be transmitted through a junction of two wafers.

Wafers require an additional level of packaging. They need to be kept free from particulate contamination during storage and handling. They also often need to be isolated from water vapor. They need to be clustered in a package that is easy to handle, which can be loaded and unloaded into a system by an unskilled operator, and which can be unloaded when the wafers in the package have been partially or fully consumed. When an extruder must change from one type of extrusion material to another during fabrication of a part, both types of material must be accessible to the extruder. If the system is expected to build sequential parts out of different extrusion materials without operator intervention, each material must be stored in the system. If several extruders are capable of depositing different materials within the system, then those different materials must be accessible to each extruder.

Figure 5A:
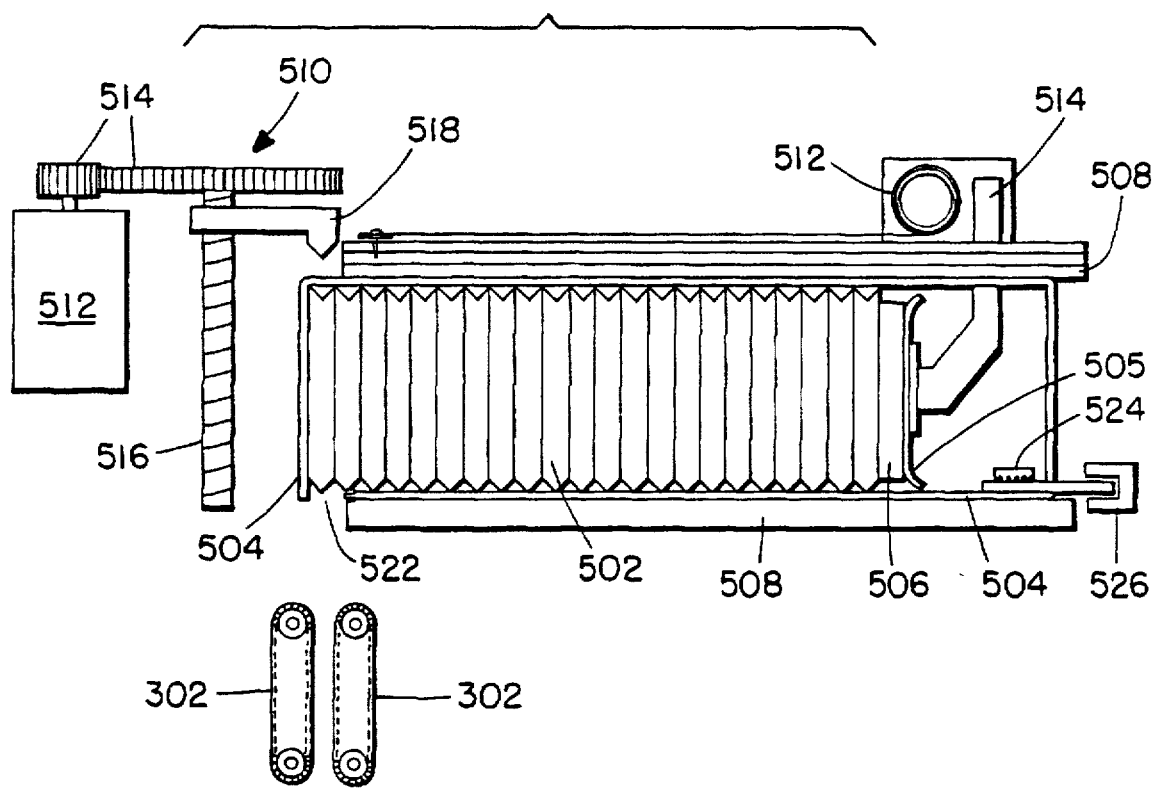
FIG. 5a shows a cassette with an electronic tag for carrying and dispensing wafers.

FIG. 5a shows a preferred embodiment of a cassette 504 which stores plural wafers 502. A spring loaded slider 505, via pressure plate 506, keeps wafers 502 pressed towards the front of the cassette 504 as wafers 502 are removed from the cassette. Cassette 504 encloses the wafers on at least four sides; during storage a removable tape (not shown) traps the front wafer. Cassette 504 will typically be shipped in shrink wrap.

Figure 5B:
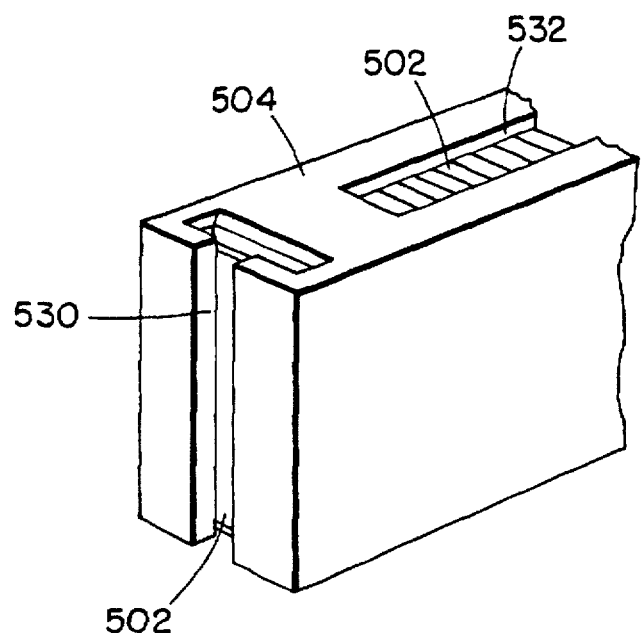
FIG. 5b shows a perspective view of the front and top (partial) of a cassette.

In use cassette 504 is manually inserted into a cassette holder 508 which orients cassette 504 under a stapling mechanism 510 and applies force to pressure plate 506 through a constant force spring 512 and arm 514 which extends through a slot 532 in the top of cassette 504 (see FIG. 5b) to advance the wafers as they are consumed.

Stapler 510 contains a drive motor 512, a gear drive 514, a lead screw 516, and a combination nut and stapler tooth 518. On demand, tractor 302 is oriented under the cassette 502, and stapler tooth 518 passes through a slot 530 (FIG. 5b) in the front of cassette 504 and presses a frontmost wafer 502 through exit slot 522 in the cassette and seats it in tractor 302.

An electronically readable and writable device 524, such as an electrically erasable read only memory, is attached to the cassette 504 so that electrical contact is made to the control system through a connector 526 when the cassette is manually inserted. Device 524 performs as an electronic tag with a variety of functions. It inform the control system of the type of extrusion material that is in the cassette and of the proper extrusion parameters for dispensing the material. It can record the current number of wafers in the cassette and provide a cassette serial number.

Figure 6:
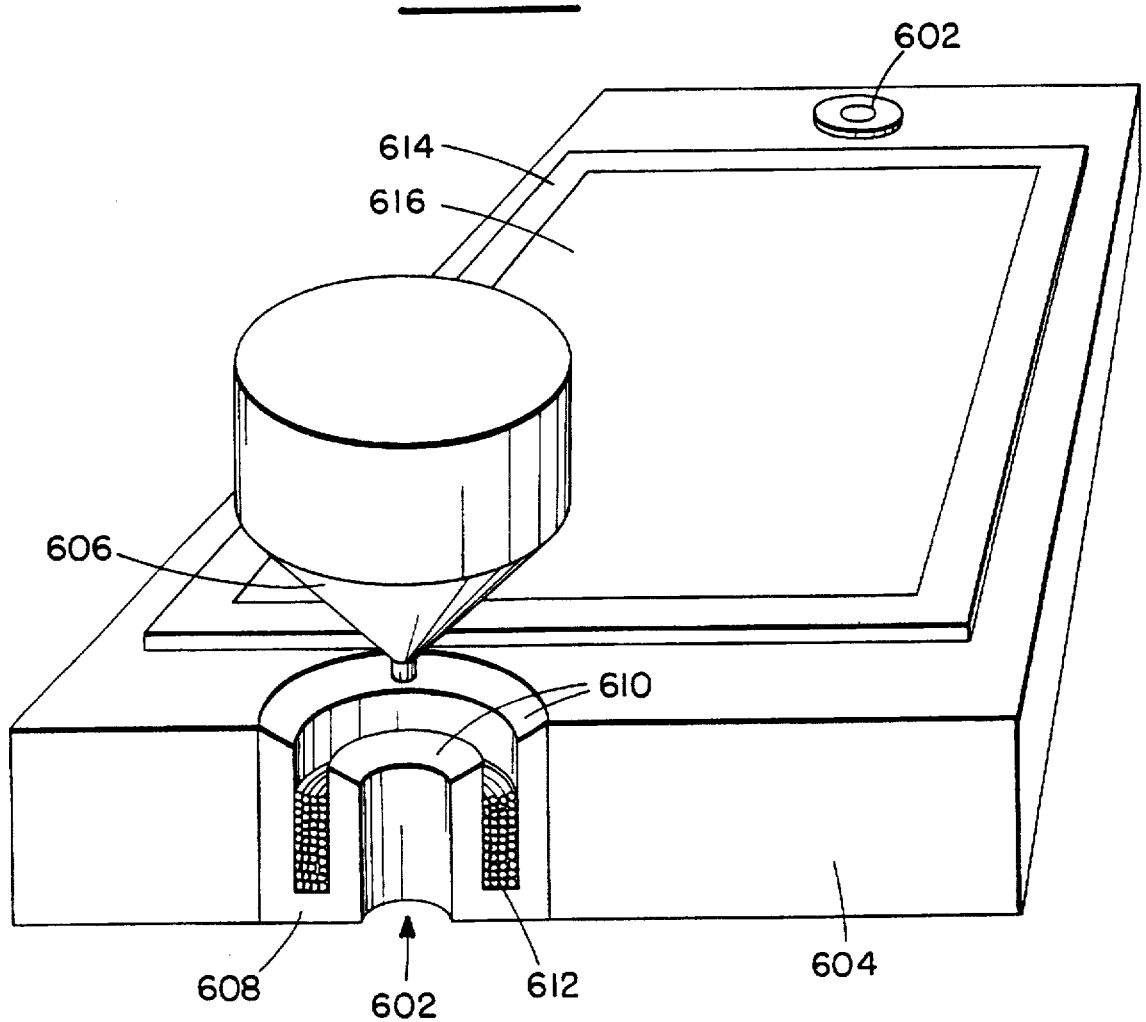
FIG. 6 shows a nozzle gage sensor in a platen employed in the invention.

Operator Free Functioning: Many functions of layered manufacturing are performed by the people that operate the extrusion machines. Such functions include system mechanical alignment, part initialization and removal, and deposition process improvement. FIG. 6 shows a sensor which relieves the operator of many alignment functions. One or more magnetic sensors 602 are embedded in a build platen 604 and provide information to the control system before the start of part building on the relative orientation of the extruder and the substrate. The conical outer surface of nozzle 606 is at least partially formed from a ferromagnetic material. Sensor 602 is a toroid of high magnetic permeability material 608, with one face removed to form a cavity 610 corresponding to the shape of nozzle 606. A winding 612 through the center of the toroid creates an inductor whose inductance varies with the position of nozzle 606. The nozzle position with respect to the sensor can be detected with three displacement degrees of freedom.

The illustrated sensing technique is preferred as it is insensitive to the temperature of nozzle 606 and possible coatings of extrusion material on nozzle 606 of indeterminate thickness. Alternative sensor techniques include thermocouples, pressure switches, strain gages, capacitance sensors, infrared detectors, optical transmitters and receivers, and acoustic ranging.

It is preferred that parts deposited on a removable substrate 614 be strongly adhered thereto to overcome two effects. Strains generated within the extruded material tend to warp the deposited structures unless the structures are supported in their correct orientation. In addition there are forces from the deposition process itself, such as pull from the nozzle and centripetal acceleration on parts that are not stationary, that tend to distort the deposited structures. It is also necessary for the parts deposited on substrate 614 to be weakly adhered thereto in order that the parts might be removed from the extrusion apparatus without damage.

These contradictory requirements are resolved in the preferred embodiment by pre-coating substrate 614 with a thermoplastic adhesive 616 that melts at a lower temperature than the extrusion material. Heater elements in build platen 604 (not shown) allow the part to be released from the substrate after the completion of the part.

Since removable substrate 614 becomes a defining surface for the parts being built, it must be held in a well defined configuration; in the preferred embodiments it approximates a plane. To reduce the weight and cost of consumable substrates 614, they are made thin enough that they are flexible, and their planarity is ensured by the flatness of build platen 604.

In the preferred embodiments, build platen 604 is formed by first casting a frame and attaching three precision parallel rails. The frame is suspended by these rails over a precision surface plate and the gap between the surface plate and the frame is filled with a settable composite such as a combination of epoxy and aluminum particles. The resulting platen is globally flat, light, and inexpensive to manufacture.

The number of process variables required to characterize and control typical layered manufacturing systems is usually in the hundreds. Tuning these variables for optimal part quality is typically performed by skilled operators. The most critical of these variables need automatic adjustment in a simple stand alone system. The key variable in the preferred embodiment that requires continual small adjustments is the calibration of the viscosity pump used in the second stage of pressurization. This calibration is performed by noting the wafer consumption entering the pre-heater and comparing it over time with the pre-determined wafer consumption. In the preferred embodiment the wafer consumption is measured by an optical encoder 312 (see FIG. 3) that is attached to the idle or non-driving belt of tractor 302.

An important element of operator-free functioning is for a layered manufacturing system to blend smoothly into the environment where it will be used. Typically this requires that the system exist on a local area network (LAN) and behave in a manner similar to a laser printer or other printer, accepting spooled files from a server, handling queues of requests, and responding to queries with status information. To minimize the intrusion of the system into its environment, the preferred embodiment is internally compensated so as to not transmit lateral vibration to its support. A preferred embodiment isolates mechanical noise and vibration produced by the system's environment from the deposition system by attaching all deposition functions to an inertial ground plane and attaching the inertial ground plane to a chassis by vibration isolators. The inertial ground plane is a vertically oriented cast rectangular frame.

To minimize the number of mechanical linkages between moving components and the inertial ground plane, the extruder attaches directly to a linear bearing on the inertial ground plane. The motion of the extruder (taken to be in the X direction) is compensated by a counterweight that is attached to the same drive belt as the extruder and is attached to linear bearings on the opposite side of the inertial ground plane. The horizontal motion of the platen (taken to be in the Y direction) is similarly compensated by a counterweight that rides on a linear bearing directly underneath the platen and moves in the opposite direction as the platen. The vertical motion of the platen and its counterweight is performed by a pair of belts and has no counterweights.

Volatiles from the extrusion process are removed from the air returned to the ambient environment in the preferred embodiment by exhausting air back into the room through activated charcoal filters.

It should be understood that the foregoing description is only illustrative of the invention. Various alternatives and modifications can be devised by those skilled in the art without departing from the invention. For instance, while the materials referred to above have been, in general, themoplastics, those skilled in the art will realize that other materials can be used with the invention, such as liquid metals, ceramic slurries, composites, etc. Accordingly, the present invention is intended to embrace all such alternatives, modifications and variances which fall within the scope of the appended claims.

We claim:

1. Apparatus for making a three-dimensional physical object by sequentially depositing, in a pattern, multiple layers of a solidifiable material on a support member, said apparatus comprising:

nozzle means for providing an extruded material;

pump means having an input and an output, said output in fluid communication with said nozzle means and providing a pressurized flow of said solidifiable material in a fluid state to said nozzle means;

motive means coupled to said pump means for enabling said pump means to provide a variable level of pressurization and rate of flow of said solidifiable material to said nozzle means; and a pressurization stage having an outlet coupled to said inlet of said pump means, for providing to said inlet said solidifiable material in a fluid state and at a determined pressure which assures, for all operational levels of pressurization and rates of flow in said pump means, that a continuous quantity of said solidifiable material is available at said inlet for continuous operation of said pump means, assuring an uninterrupted flow of said solidifiable material to and through said nozzle means, said solidifiable material supplied to said pressurization stage as a solid, said pressurization stage including:

a conduit for receiving said solid and for applying heat thereto to convert said solid to a fluid state of said solidifiable material; and drive means for physically impelling said solid into said conduit so as to pressurize said fluid state of said solidifiable material to said determined pressure.

2. The apparatus as recited in claim 1, wherein said solid solidifiable material is supplied to said drive means in said pressurization stage as a series of solid wafers.

3. The apparatus as recited in claim 2, wherein each said wafer is provided with a formed nonplanar leading surface and a formed nonplanar following surface, said leading surface of a wafer formed to nest with a following surface of a next wafer.

4. The apparatus as recited in claim 2, wherein said drive means comprises:

first and second belt drives disposed in opposition about a feed path, for receiving said wafers between belts of said belt drives and imparting a driving motion thereto.

5. The apparatus a recited in claim 2, further comprising:

removable cassette means for holding a plurality of said wafers;

a holder juxtaposed to said drive means for receiving a cassette means; and means for removing individual wafers from said cassette means and for causing said wafers to enter said drive means.

6. The apparatus as recited in claim 5, wherein each said cassette means includes an electronically readable data store, said holder including connector means for coupling to said data store upon an insertion of a cassette into said holder, whereby data in said data store is made available to an exterior controller.

7. The apparatus as recited in claim 1, wherein said pump means is a viscosity pump comprising a rotary impeller connected to said motive means, and a mating collet surrounding said impeller, said mating collet coupled to said nozzle means.

8. The apparatus as recited in claim 1, further comprising:

a removable substrate for receiving said solidifiable material from said nozzle means;

a platen for supporting said removable substrate;

means for causing relative movement between said platen and said nozzle means to enable controlled deposition of said solidifiable material on said substrate; and means for adhering said substrate to said platen.

9. The apparatus as recited in claim 8, wherein said removable substrate comprises a support and an adhesive coating for receiving said solidifiable material, said adhesive coating having a melting point temperature that is lower than a melting point temperature of said solidifiable material, whereby deposition of fluid state solidifiable material causes a melting of an underlying area of said adhesive coating and a hardening thereof occurs as said solidifiable material solidifies.

10. The apparatus as recited in claim 9, wherein said support is a sheet of a magnetic material and said platen includes magnetic means for attracting said magnetic material.

11. The apparatus as recited in claim 8, wherein said platen includes at least one magnetic sensor and said nozzle means is comprised of a magnetic material, said magnetic sensor providing a signal to a controller for enabling control of said means for causing relative movement.

12. An apparatus for providing wafers of solidifiable material to an extruder, comprising:

removable cassette means for holding a plurality of said wafers;

a holder for receiving a cassette means; and means for removing individual wafers from said cassette means and for causing said wafers to pass to said extruder.

13. The apparatus as recited in claim 12, wherein each said cassette means includes an electronically readable data store, said holder including connector means for coupling to said data store upon an insertion of a cassette into said holder, whereby data in said data store is made available to an exterior controller of said extruder.

14. The apparatus as recited in claim 12, wherein each said wafer is provided with a formed nonplanar leading surface and a formed nonplanar following surface, said leading surface of a wafer formed to nest with a following surface of a next wafer.

15. The apparatus as recited in claim 12, wherein said extruder includes a pressurizing drive means for receiving said wafers from said cassette and comprises:

first and second belt drives disposed in opposition about a feed path, for receiving said wafers between belts of said belt drives and imparting a driving motion thereto which forces said wafers into a fluidizing conduit of said extruder.

16. A method for making a three-dimensional physical object by sequentially depositing, in a pattern, multiple layers of a solidifiable material on a support member, said method employing apparatus which includes a nozzle means for providing an extruded material, pump means having an input and an output, said output in fluid communication with said nozzle means and providing a pressurized flow of said solidifiable material in a fluid state to said nozzle means, motive means for enabling said pump means to provide a variable level of pressurization and rate of flow of said solidifiable material to said nozzle means and a pressurization stage having an outlet coupled to said inlet of said pump means, for providing to said inlet said solidifiable material in a fluid state, said method comprising the steps of:

controlling said motive means to cause said pump means to provide a continuous flow of said solidifiable material to said nozzle means; and feeding a solid form of said solidifiable material to said pressurization stage at a rate and with an amount of force which assures that a determined pressure is created in said pressurization means which further assures, for all operational levels of pressurization and rates of flow created by operation of said pump means, that a continuous quantity of said solidifiable material is available at said inlet for continuous operation of said pump means, thereby assuring an uninterrupted flow of said solidifiable material to and through said nozzle means.

* * * * *